US008859163B2

(12) United States Patent
Owejan et al.

(10) Patent No.: US 8,859,163 B2
(45) Date of Patent: Oct. 14, 2014

(54) PEM FUEL CELL STACK INLET WATER REGULATION SYSTEM

(75) Inventors: Jon P. Owejan, Honeoye, NY (US); Steven G. Goebel, Victor, NY (US); James M. Keogan, Lima, NY (US); Thomas A. Trabold, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 914 days.

(21) Appl. No.: 12/579,610

(22) Filed: Oct. 15, 2009

(65) Prior Publication Data

US 2011/0091779 A1    Apr. 21, 2011

(51) Int. Cl.
*H01M 8/04*    (2006.01)
*H01M 8/10*    (2006.01)

(52) U.S. Cl.
CPC ...... *H01M 8/04291* (2013.01); *H01M 8/04395* (2013.01); *H01M 8/04388* (2013.01); *H01M 8/04171* (2013.01); *H01M 2008/1095* (2013.01); *Y02E 60/50* (2013.01); *H01M 8/04753* (2013.01)
USPC ............ 429/512; 429/413; 429/450; 429/458

(58) Field of Classification Search
CPC .............. H01M 8/04; H01M 8/04082; H01M 8/04089; H01M 8/04119–8/04179; H01M 8/04492–8/04522; H01M 8/04828–8/04843
USPC .......................................... 429/512–516, 535
See application file for complete search history.

(56) References Cited

U.S. PATENT DOCUMENTS

| 6,566,004 | B1 * | 5/2003 | Fly et al. ................. 429/434 |
| 2004/0067399 | A1 * | 4/2004 | Kobayashi et al. ........... 429/25 |
| 2004/0229100 | A1 * | 11/2004 | Komura et al. ............... 429/32 |
| 2008/0171253 | A1 * | 7/2008 | Owejan et al. ............... 429/34 |

FOREIGN PATENT DOCUMENTS

| CN | 102005591 A | 4/2011 | |
| DE | 102008006736 A1 | 8/2008 | |
| DE | 102008033472 A1 | 2/2009 | |
| JP | 2007/141639 | * 6/2007 | H01M 8/24 |
| WO | WO 2008/061094 | * 5/2008 | H01M 8/02 |

OTHER PUBLICATIONS

Machine translation of JP 2007-141639 (Jun. 2007).*
Fuel Cell Vaporization Unit 482127, Disclosed anonymously.

* cited by examiner

*Primary Examiner* — Jonathan Crepeau
*Assistant Examiner* — Jacob Buchanan
(74) *Attorney, Agent, or Firm* — Fraser Clemens Martin & Miller LLC; J. Douglas Miller

(57) ABSTRACT

A fuel cell assembly is provided that includes a fluid collection member disposed in a fluid inlet for a reactant, wherein the fluid collection member militates against liquid water on an inner surface of the fluid inlet from being received by a fuel cell of the fuel cell assembly.

20 Claims, 3 Drawing Sheets

PEM FUEL CELL STACK INLET WATER REGULATION SYSTEM

FIELD OF THE INVENTION

The present disclosure relates to a fuel cell stack and more particularly to a fuel cell stack including a system to militate against liquid water from entering a fuel cell of the fuel cell stack.

BACKGROUND OF THE INVENTION

Fuel cell power systems convert a fuel and an oxidant (reactants) to electricity. One type of fuel cell power system employs a proton exchange membrane (PEM) to catalytically facilitate reaction of the fuel (such as hydrogen) and the oxidant (such as air or oxygen) to generate electricity. Water is a byproduct of the electrochemical reaction. The PEM is a solid polymer electrolyte that facilitates transfer of protons from an anode electrode to a cathode electrode in each individual fuel cell of a stack of fuel cells normally deployed in a fuel cell power system.

In the typical fuel cell assembly, the individual fuel cells have fuel cell plates with channels, through which various reactants and cooling fluids flow. Fuel cell plates may be unipolar, for example. A bipolar plate may be formed by combining unipolar plates. The oxidant is supplied to the cathode electrode from a cathode inlet header and the fuel is supplied to the anode electrode from an anode inlet header. Movement of water from the channels to an outlet header is typically caused by the flow of the reactants through the fuel cell assembly. Boundary layer shear forces and a pressure of the reactant aid in transporting the water through the channels until the water exits the fuel cell through the outlet header.

A membrane-electrolyte-assembly (MEA) is disposed between successive plates to facilitate the electrochemical reaction. The MEA includes the anode electrode, the cathode electrode, and an electrolyte membrane disposed therebetween. Porous diffusion media (DM) are positioned on both sides of the MEA to facilitate a delivery of reactants for the electrochemical fuel cell reaction.

Water accumulation within the channels of the fuel cell can result in a degradation of a performance of the fuel cell. Particularly, water accumulation causes reactant flow maldistribution in individual fuel cell plates and within the fuel cell assembly, which can lead to voltage instability that may cause a degradation of the electrodes. Additionally, water remaining in the fuel cell after operation may solidify in sub-freezing temperatures, creating difficulties during a restart of the fuel cell. Water accumulating in the channel regions includes the water byproduct of the electrochemical reaction, liquid water that may accumulate on an inner surface of an inlet flow path for the reactants, and water entrained in the reactant flow streams.

Numerous techniques have been employed to manage water accumulation within the fuel cell. These techniques include pressurized purging, gravity flow, and evaporation, for example. Additionally, the use of water transport structures and surface coatings have been employed that facilitate the transport of water from the channel regions of the fuel cell into an exhaust region of the fuel cell assembly, for example. The methods to manage water accumulation typically focus on removal of water that has accumulated within the channels of the fuel cell and require additional operational steps and/or components for the fuel cell. The additional operational steps and components are known to reduce an efficiency of operating the fuel cell and increase a cost of manufacturing the fuel cell. Liquid water that accumulates on the inner surface of the inlet flow path and water entrained in the reactant flow streams increases a need to employ the various techniques, transport structures, and surface coatings to facilitate removal of water from the channels of the fuel cell.

It would be desirable to produce a cost effective fuel cell stack that minimizes an accumulation of water within a fuel cell and the number of required components to facilitate a removal of water from the fuel cell.

SUMMARY OF THE INVENTION

Compatible and attuned with the present invention, a cost effective fuel cell stack that minimizes an accumulation of water within a fuel cell and the number of required components to facilitate a removal of water from the fuel cell, has been surprisingly discovered.

In one embodiment, a fluid regulation system for a fuel cell stack comprises a fluid inlet providing a flow path for a reactant gas to a fuel cell of the fuel cell stack; a fluid collection member formed in the fluid inlet adapted to collect a liquid flowing through the fluid inlet; and a fluid conduit in fluid communication with the fluid collection member providing a flow path to drain the liquid from the fluid collection member.

In another embodiment, a fuel cell stack assembly comprises a first end plate and a spaced apart second end plate; at least one fuel cell disposed between the first end plate and the second end plate; a fluid inlet providing a flow path for a reactant gas to the at least one fuel cell; a fluid collection member formed in the fluid inlet adapted to collect a liquid flowing through the fluid inlet; a fluid conduit in fluid communication with the fluid collection member providing a flow path to drain the liquid from the fluid collection member; and a flow restrictor disposed in the fluid conduit to control the flow of the reactant gas therethrough.

In another embodiment, a method of regulating liquid water flowing into a fuel cell comprises the steps of providing a first end plate and a spaced apart second end plate; providing at least one fuel cell between the first end plate and the second end plate; providing a fluid inlet in fluid communication with the at least one fuel cell to provide a flow of a reactant gas to the at least one fuel cell; collecting liquid flowing within the fluid inlet in a fluid collection member formed in the fluid inlet; and draining the liquid from the fluid collection member.

DRAWINGS

The above, as well as other advantages of the present invention will become readily apparent to those skilled in the art from the following detailed description, particularly when considered in the light of the drawings described hereafter.

DETAILED DESCRIPTION OF THE INVENTION

Figure 1:
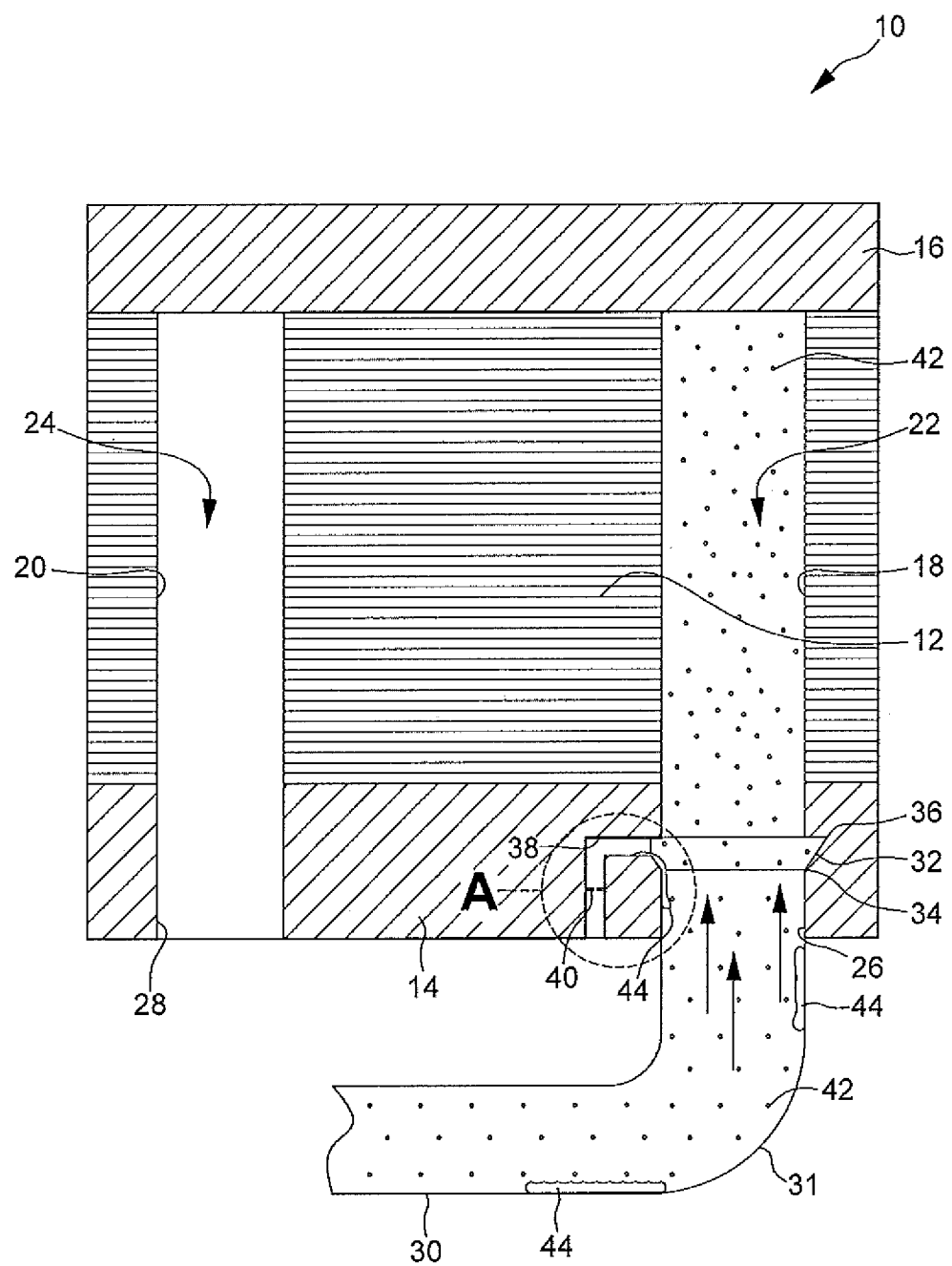
FIG. 1 is a schematic cross-sectional elevational view of a fuel cell stack according to an embodiment of the invention.

The following description is merely exemplary in nature and is not intended to limit the present disclosure, application, or uses. It should also be understood that throughout the drawings, corresponding reference numerals indicate like or corresponding parts and features.

FIG. 1 shows a fuel cell assembly 10 according to an embodiment of the present disclosure. The fuel cell assembly 10 includes a plurality of stacked fuel cells 12 disposed between end plates 14, 16. Each of the fuel cells 12 includes an inlet port 18 and an outlet port 20. The fuel cells 12 are stacked with the inlet port 18 and the outlet port 20 of each fuel cell 12 substantially aligned with the respective inlet port 18 and the outlet port 20 of an adjacent fuel cell 12. Collectively, the inlet ports 18 of each of the fuel cells 12 form an inlet header 22 and the outlet ports 20 of each of the fuel cells 12 form an outlet header 24. The inlet header 22 is adapted to provide a flow of a reactant such as a fuel (such as hydrogen) from a source of fuel (not shown) or an oxidant (such as air or oxygen) from a source of oxidant (not shown), for example, to the fuel cells 12. The fuel cell assembly 10 shown is illustrative of both an anode inlet header and an anode outlet header (for the fuel), and a cathode inlet header and a cathode outlet header (for the oxidant).

The end plate 14 includes an inlet 26 formed therein in fluid communication with the inlet header 22 and an outlet 28 formed therein in fluid communication with the outlet header 24. A supply conduit 30 provides fluid communication from the source of the reactant to the inlet 26 of the end plate 14. The supply conduit 30, the inlet 26 of the end plate 14, and the inlet header 22 form a flow path or a fluid inlet from the source of the reactant to the fuel cells 12. It should be understood that the fuel cell assembly 10 typically includes a coolant inlet header in fluid communication with a coolant inlet formed in an end plate, and a coolant outlet header in fluid communication with a coolant outlet formed in an end plate. The supply conduit 30 may include a bend 31. The bend facilitates contact of the water 42 with an interior surface of the supply conduit 30 to form the water film 44. It should be understood that the supply conduit may form a flow path therein having a generally circular, oval, rectangular, or other desired cross-sectional shape to facilitate contact of the water 42 with an interior surface of the supply conduit 30. The supply conduit 30 may also be oriented to employ gravitational forces to facilitate contact of the water 42 with an interior surface of the supply conduit 30. For example, the generally rectangular shape can be provided for the flow path of the supply conduit 30, wherein at least a portion of the supply conduit 30 is oriented in a horizontal position. The shorter sides of the generally rectangular shape are oriented in a vertical position to minimize the distance the water 42 must fall by gravitational pull to contact the interior surface of the supply conduit 30. A cross-sectional area of the flow path through the supply conduit 30 is provided to maintain a desired reactant flow and to minimize a pressure drop of the reactant flowing through the conduit 30. Further, it should be understood that the cross-sectional area of the flow path through the conduit 30 may be maximized to minimize a velocity of the reactant flowing therethrough. The minimized velocity facilitates contact of the water 42 with a lower horizontal interior surface of the supply conduit 30 by gravitational pull.

A fluid collection member 32 is formed in a surface forming the inlet 26 of the end plate 14. In the illustrated embodiment, the fluid collection member 32 is a generally v-shaped groove having an upstream edge 34 and a downstream edge 36 formed in and circumscribing the surface forming the inlet 26. It should be understood that the groove can have other shapes such as a square-shaped groove, for example. A fluid conduit 38 is formed in the end plate 14 providing fluid communication between the fluid collection member 32 and a water exhaust conduit (not shown). A flow restrictor 40 such as a nozzle, for example, is provided within the fluid conduit 38 to regulate the flow of fluid therethrough.

In use, the reactant is caused to flow from the source through the supply conduit 30, the inlet 26 of the end plate 14, and the inlet header 22 into the fuel cells 12. The reactant can include a water 42 entrained therein which may collect and form a water film 44 on the inner surfaces of the supply conduit 30, the inlet 26, and the inlet header 22. The flow of the reactant can propel the water film 44 along the inner surfaces of the supply conduit 30 and the inlet 26 toward the inlet header 22. As the water film 44 is propelled toward the inlet header 22, the water film 44 flows past the upstream edge 34 of the fluid collection member 32 and is received therein. The downstream edge 36 of the fluid collection member 32 is adapted to militate against the water film 44 being propelled out of the fluid collection member 32 toward the inlet header 22. In the illustrated embodiment, the downstream edge 36 is substantially perpendicular to the inner surface forming the inlet 26. It should be understood that downstream edge 36 can have other orientations in respect of the inner surface forming the inlet 26. Further, the downstream edge 36 can include a lip extending outwardly therefrom, a recess formed therein, or any other suitable member adapted to militate against the water film 44 being propelled out of the fluid collection member 32 toward the inlet header 22.

A fluid pressure of the reactant flowing through the supply conduit 30 and the inlet 26 provides a driving force for the water film 44 received in the fluid collection member 32 to flow through the fluid conduit 38 to the water exhaust conduit. A quantity of reactant may also flow through the fluid conduit 38 which reduces the quantity of reactant supplied to the fuel cells 12. The flow restrictor 40 minimizes the flow of reactant through the fluid conduit 38 to minimize the quantity of the reactant that can bypass the fuel cells 12 and flow into the water exhaust conduit. The flow restrictor 40 can be adapted to restrict the flow of the reactant through the fluid conduit 38 to less than about 1% of the total flow of the reactant flowing through the supply conduit 30, while still causing the water film 44 received in the fluid collection member 32 to flow through the fluid conduit 38 and to the water exhaust conduit. It should be understood that an actuated valve can be employed with the fluid conduit 38 to selectively control the flow of fluid therethrough. The fluid conduit 38 and flow restrictor 40 are particularly effective for managing water in a cathode inlet header where a small quantity of cathode reactant, typically atmospheric air or oxygen, bypassing the fuel cells 12 is generally acceptable. A capacity of the fluid collection member 32 can be selected to accommodate a desired amount of the water film 44 and militate against the water film 44 from flowing past the fluid collection member 32.

The fluid collection member 32 minimizes the quantity of liquid water entering the fuel cells 12 by collecting the water film 44 disposed on the inner surfaces of the conduit 30 and the inlet 26. Minimizing the quantity of liquid water entering the fuel cells 12 minimizes an accumulation of liquid water therein, which can disrupt the flow of the reactant therethrough. By minimizing disruptions in the flow of the reactant through the fuel cells 12, electrical voltage stability and efficient operation of the fuel cell stack is maximized. Additionally, by minimizing an accumulation of liquid water in the fuel cells 12, the likelihood that frozen water will form therein during periods of low temperature operation of the fuel cell assembly 10 such as a start-up period, for example, is also minimized. Frozen water in the fuel cells 12 can disrupt the flow of the reactant and cause a degradation of the components of the MEA by placing an increased compressive force thereon as a result of the volumetric expansion associated with the freezing of the water. Accordingly, minimizing the quantity of the water film 44 received by the fuel cells 12 can minimize a likelihood of frozen water disrupting the flow of the reactants therethrough and causing a degradation of the components of the MEA. Further, by minimizing the quantity of the water film 44 entering the fuel cells 12, processes and components for the fuel cell assembly 10 adapted to manage and/or remove liquid water from the fuel cells 12 can be eliminated or minimized. The elimination or minimization of such processes and components can minimize a cost of manufacturing the fuel cell assembly 10 and/or the number of components required for the fuel cell assembly 10, and can maximize an operational efficiency of the fuel cell assembly 10.

Figure 2:
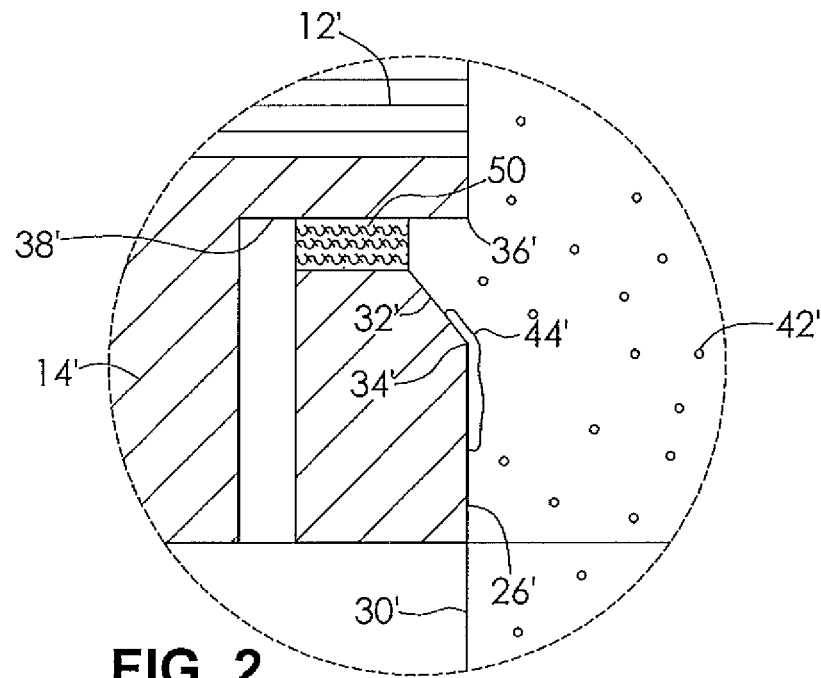
FIG. 2 is an enlarged fragmentary cross-sectional view of area A shown in FIG. 1 illustrating another embodiment of the invention.

FIG. 2 illustrates an alternate embodiment of the invention. Structure similar to that illustrated in FIG. 1 includes the same reference numeral and a prime (') symbol for clarity. In the embodiment shown, a wicking element 50 is disposed in the fluid conduit 38' which militates against the reactant flowing through the fluid conduit 38' to the water exhaust conduit. Collected liquid water in the fluid collection member 32' flows through the wicking element 50 by capillary forces. The liquid water flows through the wicking element 50 and then continues to flow through the fluid conduit 38' to the water exhaust conduit. Employing the wicking element 50 militates against reactant flowing through the fluid conduit 38' and bypassing the fuel cells 12'. The wicking element 50 is particularly suited for managing water in an anode inlet header where it is typically desired to minimize an amount of reactant, typically hydrogen gas, bypassing the fuel cells 12'.

Figure 3:
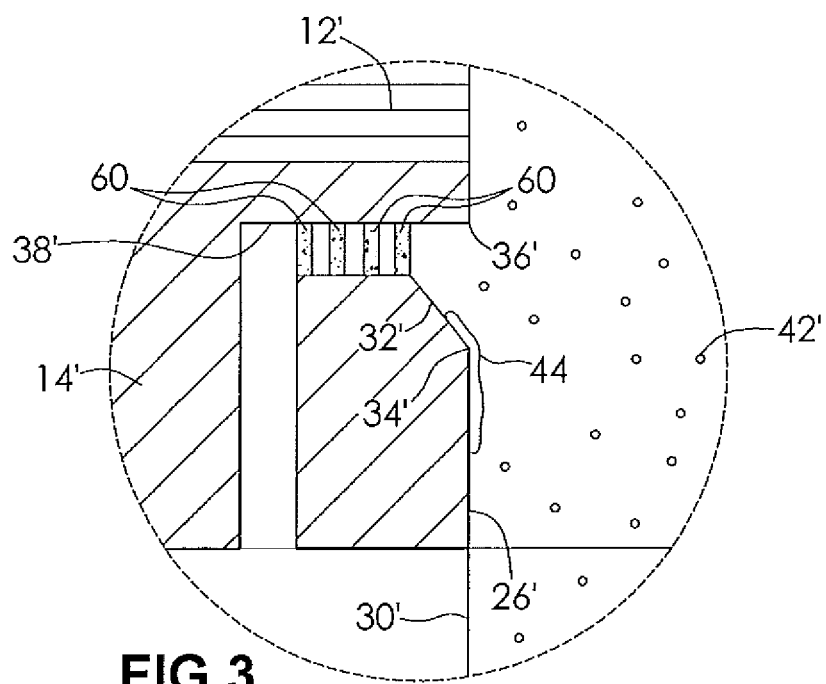
FIG. 3 is an enlarged fragmentary cross-sectional view of area A shown in FIG. 1 illustrating another embodiment of the invention.

In certain applications, the wicking element 50 may permit an amount of the reactant to flow into the water exhaust conduit and bypass the fuel cells 12' which exceeds a desired amount such as when the fluid pressure of the reactant exceeds a critical fluid pressure in respect of the wicking element 50, for example. It is anticipated that a critical fluid pressure for a typical wicking element 50 would be between about 10 kPa and 20 kPa. As shown in FIG. 3, in a fuel cell assembly 10' employing a reactant gas having a fluid pressure that exceeds the critical fluid pressure of the wicking element 50, the wicking element 50 can be replaced with a series of two or more spaced apart hydrophilic porous elements 60. Each hydrophilic porous element 60 provides a selected differential pressure thereacross. The series of the hydrophilic porous elements 60 is adapted to militate against the reactant gas passing therethrough while allowing liquid water to pass therethrough. Typically, the hydrophilic porous elements 60 are kept sufficiently wet with liquid water to maintain the desired differential pressure thereacross. Accordingly, at least a portion of the fluid conduit 38' including the hydrophilic porous elements 60 can be oriented in a horizontal position to facilitate retaining liquid water therein to keep the hydrophilic porous elements 60 sufficiently wet. Further, liquid water can be provided to the hydrophilic porous elements 60 from liquid water entrained in exhaust flowing from the outlet header and/or another suitable source of liquid water, for example. It should be understood that the flow restrictor 40 and the wicking element 50 illustrated in FIG. 1 and FIG. 2, respectively, and the hydrophilic porous element 60 can be employed separately or in any combination thereof in the fluid conduit 38' to militate against the reactant bypassing the fuel cells 12'. The remaining structure and function of the embodiment illustrated in FIGS. 2-3 is substantially equivalent to the function and structure of the embodiment illustrated in FIG. 1 previously described herein.

Figure 4:
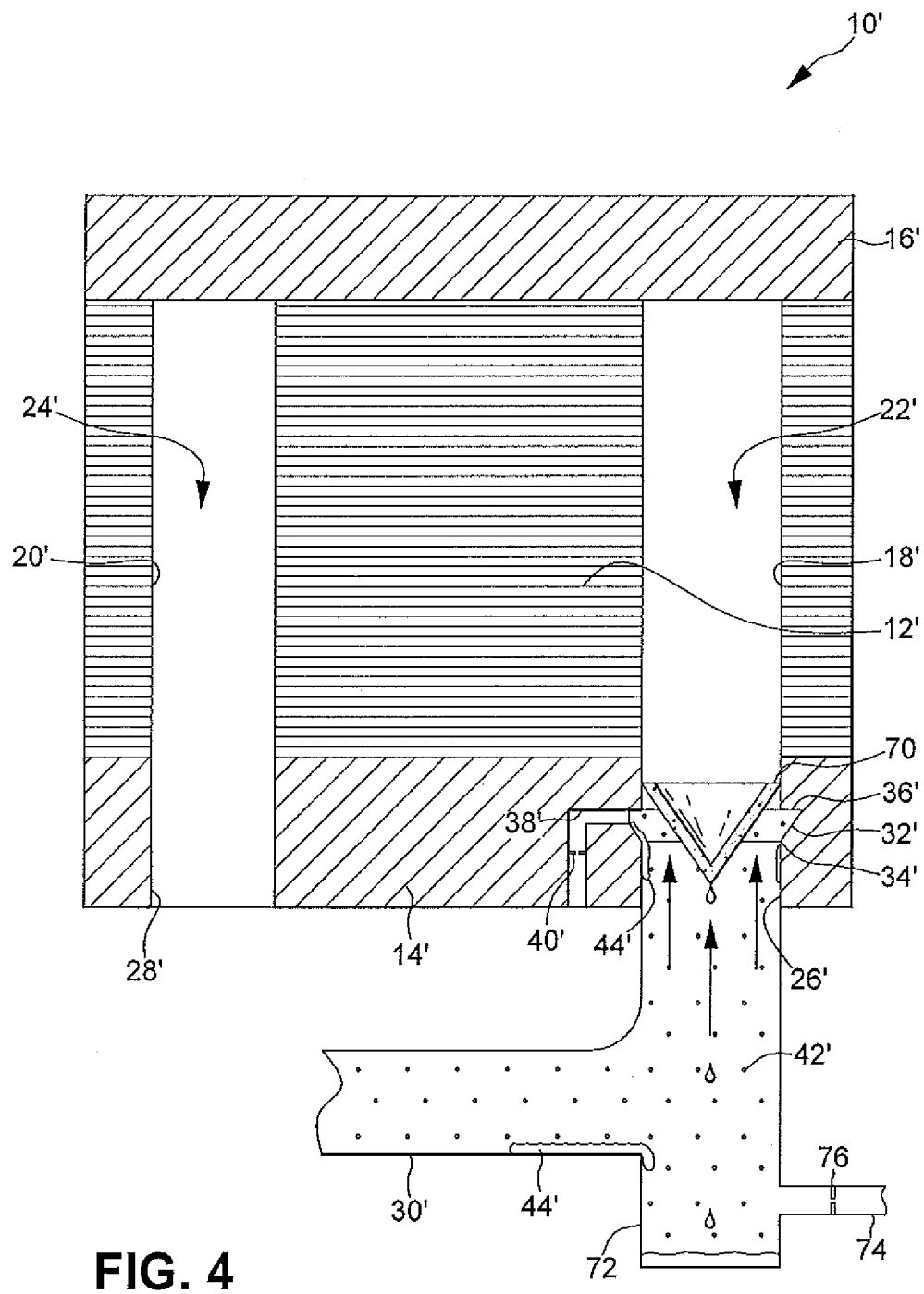
FIG. 4 is a schematic cross-sectional elevational view of a fuel cell stack illustrating another embodiment of the invention.

FIG. 4 illustrates an alternate embodiment of the invention. Structure similar to that illustrated in FIG. 1 includes the same reference numeral and a prime (') symbol for clarity. In FIG. 4, a porous element 70 is disposed in the inlet 26' of the end plate 14' downstream from the fluid collection member 32'. In the illustrated embodiment, the porous element 70 is a substantially cone shaped member having a periphery thereof abut the surface forming the inlet 26', wherein the reactant is caused to pass through the porous element 70 prior to being received by the inlet header 22'. It should be understood that other shapes can be employed for the porous element 70 such as a substantially planar member or other suitable curvilinear shapes, either of which may include corrugated surfaces, for example. The porous element 70 can be formed from a hydrophilic material, a hydrophobic material, or any other suitable material adapted to collect the water 42' entrained in the reactant. A second fluid collection member 72 can be provided upstream from the porous element 70 such as within the supply conduit 30', for example, wherein liquid water collected by the porous element 70 is received by the second fluid collection member 72. A second fluid conduit 74 in fluid communication with the second fluid collection member 72 is provided for draining liquid water collected in the second fluid collection member 72 to a water exhaust conduit (not shown). A second flow restrictor 76 such as a nozzle, for example, is disposed within the second fluid conduit 74 to regulate the flow of fluid through the second fluid conduit 74.

In use, the reactant is caused to flow from the source through the supply conduit 30', the inlet 26' of the end plate 14', and the inlet header 22' into the fuel cells 12'. The reactant can include the water 42' entrained therein which may collect and form the water film 44' on the inner surfaces of the supply conduit 30', the inlet 26', and the inlet header 22'. As previously discussed herein for the embodiment shown in FIG. 1, the fluid collection member 32' and the fluid conduit 38' cooperate to militate against the water film 44' on the inner surfaces of the supply conduit 30' and the inlet 26' being received by the fuel cells 12'.

The reactant is caused to pass through the porous element 70 prior to being received by the fuel cells 12'. As the reactant passes through the porous element 70, the water 42' entrained in the reactant is collected by the porous element 70, which minimizes the water 42' entering the fuel cells 12'. It should be understood that the porous element 70 can be formed from a material having a selected water collecting characteristic to provide a desired maximum relative humidity of the reactant entering the fuel cells 12'. Further, the porous element 70 can be formed from a material having a selected resistance to a flow of fluid therethrough to provide a desired fluid pressure change across the porous element 70 to facilitate forming a desired flow distribution of the reactant into the fuel cells 12'.

Liquid water collected by the porous element 70 drains into the second fluid collection member 72 by gravitational force. Additionally, the water 42' entrained in the reactant which may collect and form the water film 44' on the inner surfaces of the supply conduit 30' is also collected in the second fluid collection member 72. A capacity of the second fluid collection member 72 can be selected to accommodate a desired amount of liquid water and militate against the water collected therein, whether in liquid or solid form, from interfering with a flow of the reactant through the supply conduit 30'. During periods of operation of the fuel cell assembly 10' when the relative humidity of the reactant is below the selected maximum relative humidity, water can be evaporated from the porous element 70 and/or the second fluid collection member 72 into the reactant.

A fluid pressure of the reactant flowing through the supply conduit 30' provides a driving force for liquid water in the second fluid collection member 72 to flow through the second fluid conduit 74 to the water exhaust conduit. A quantity of reactant may also flow through the second fluid conduit 74 which reduces the quantity of reactant supplied to the fuel cells 12'. The second flow restrictor 76 minimizes the flow of reactant through the second fluid conduit 74 to minimize the quantity of the reactant that bypasses the fuel cells 12' and flows into the water exhaust conduit. The second flow restrictor 76 can be adapted to restrict the flow of the reactant through the second fluid conduit 74 to less than about 1% of the total flow of the reactant in the supply conduit 30', while still causing collected liquid water to flow to the water exhaust line. It should be understood that an actuated valve can be employed with the second fluid conduit 74 to selectively control the flow of fluid therethrough. It should be understood that the wicking element 50 and the hydrophilic porous elements 60 illustrated in FIGS. 2 and 3, respectively, can be employed separately or in combination with each other and the second flow restrictor 76 in the second fluid conduit 74 to militate against the reactant bypassing the fuel cells 12'.

The porous element 70 and the second fluid collection member 72 and the fluid collection member 32' minimize and/or regulate the quantity of water entering the fuel cells 12'. The porous element 70 and the second fluid collection member 72 and the fluid collection member 32' also facilitate a uniform distribution of water entering the fuel cells 12'. The remaining structure and function of the embodiment illustrated in FIG. 4 is substantially equivalent to the function and structure of the embodiments illustrated in FIGS. 1-3 previously described herein.

While certain representative embodiments and details have been shown for purposes of illustrating the invention, it will be apparent to those skilled in the art that various changes may be made without departing from the scope of the disclosure, which is further described in the following appended claims.

What is claimed is:

1. A fluid regulation system for a fuel cell stack comprising:
    a fluid inlet formed in an end plate and providing a flow path for a reactant gas to a fuel cell of the fuel cell stack, the fluid inlet adjacent to and in fluid communication with an inlet header of the fuel cell stack;
    a fluid collection member formed in a surface forming the fluid inlet upstream from the inlet header; the fluid collection member is a groove having a downstream edge adapted to collect a liquid flowing through the fluid inlet, upstream of the inlet header; and
    a fluid conduit formed in the end plate adjacent the fluid inlet and in fluid communication with the fluid collection member, the fluid conduit providing a flow path to drain the liquid from the fluid collection member.

2. The system according to claim 1, further comprising a flow restrictor disposed in the fluid conduit to control a flow of the reactant gas therethrough.

3. The system according to claim 2, wherein the flow restrictor is one of a nozzle, a wicking material, and a hydrophilic porous element.

4. The system according to claim 2, wherein the flow restrictor restricts a flow of the reactant gas through the fluid conduit to less than about one percent of a total flow of the reactant gas flowing through the fluid inlet.

5. The system according to claim 1, wherein the fluid inlet includes a bend formed therein to facilitate the collection of the liquid flowing through the fluid inlet on an interior surface of the fluid inlet.

6. The system according to claim 1, wherein at least a portion of the fluid inlet is oriented in a horizontal position to facilitate the collection of the liquid flowing through the fluid inlet on an interior surface of the fluid inlet.

7. The system according to claim 1, further comprising:
    a porous element disposed in the fluid inlet effective to collect a liquid water from the reactant gas flowing therethrough, the reactant gas flowing through the porous element prior to flowing into the fuel cell;
    a second fluid collection member formed in the fluid inlet adapted to receive liquid collected by the porous element; and
    a second fluid conduit in fluid communication with the second fluid collection member providing a flow path to drain liquid from the second fluid collection member.

8. The system according to claim 7, wherein the porous element is one of a hydrophilic material and a hydrophobic material.

9. The system according to claim 7, including a second flow restrictor disposed in the second fluid conduit to control a flow of the reactant gas therethrough, wherein the second flow restrictor is at least one of a nozzle, a wicking material, and a hydrophilic porous element.

10. The system according to claim 9, wherein the second flow restrictor restricts a flow of the reactant gas through the second fluid conduit to less than about one percent of a total flow of the reactant gas flowing through the fluid inlet.

11. The system according to claim 1, wherein the fluid inlet is one of an anode inlet and a cathode inlet.

12. A fuel cell stack assembly comprising:
    a first end plate and a spaced apart second end plate;
    at least one fuel cell disposed between the first end plate and the second end plate;
    a fluid inlet formed in the first end plate and providing a flow path for a reactant gas to the at least one fuel cell, the fluid inlet adjacent to and in fluid communication with an inlet header of the fuel cell stack;
    a fluid collection member formed in a surface forming the fluid inlet upstream from the inlet header, the fluid collection member is a groove having a downstream edge adapted to collect a liquid flowing through the fluid inlet upstream of the inlet header;
    a fluid conduit formed in the first end plate adjacent to the inlet and in fluid communication with the fluid collection member, the fluid conduit providing a flow path to drain the liquid from the fluid collection member; and
    a flow restrictor disposed in the fluid conduit to control the flow of the reactant gas therethrough.

13. The fuel cell stack assembly according to claim 12, wherein the flow restrictor is one of a nozzle, a wicking material, and a hydrophilic porous element.

14. The fuel cell stack assembly according to claim 12, wherein the fluid collection member is a groove formed in and circumscribing a surface forming the fluid inlet.

15. The fuel cell stack assembly according to claim 14, wherein the groove is generally v-shaped.

16. The fuel cell stack assembly according to claim 12, further comprising:
    a porous element disposed in the fluid inlet effective to collect a liquid water from the reactant gas flowing therethrough, the reactant gas flowing through the porous element prior to flowing into the fuel cell;

a second fluid collection member formed in the fluid inlet adapted to receive the liquid collected by the porous element; and a second fluid conduit in fluid communication with the second fluid collection member providing a flow path to drain the liquid from the second fluid collection member.

17. The fuel cell stack assembly according to claim 16, wherein the porous element is one of a hydrophilic and a hydrophobic material.

18. The fuel cell stack assembly according to claim 16, including a flow restrictor disposed in the second fluid conduit to control the flow of the reactant gas therethrough, wherein the flow restrictor is at least one of a nozzle, a wicking material, and a hydrophilic porous element.

19. A method of regulating liquid water flowing into a fuel cell comprising the steps of:

providing a first end plate and a spaced apart second end plate;

providing at least one fuel cell between the first end plate and the second end plate;

providing a fluid inlet formed in the first end plate and in fluid communication with an inlet header of the at least one fuel cell to provide a flow of a reactant gas to the at least one fuel cell;

collecting liquid flowing within the fluid inlet upstream from the inlet header in a fluid collection member formed in a surface forming the fluid inlet, wherein the fluid collection member is a groove including a downstream edge adapted to collect the liquid; and draining the liquid from the fluid collection member through a fluid conduit formed in the end plate adjacent to the inlet and in fluid communication with the fluid collection member.

20. The method of claim 19, further comprising the steps of:

providing a porous element in the fluid inlet effective to collect a liquid water from the reactant gas flowing therethrough, the reactant gas flowing through the porous element prior to flowing into the fuel cell;

receiving the liquid collected by the porous element in a second fluid collection member formed in the fluid inlet; and draining the liquid from the second fluid collection member.

* * * * *